Jan. 26, 1926.
E. B. LUCAS
1,571,128
THRASHING MACHINE
Filed Nov. 30, 1925
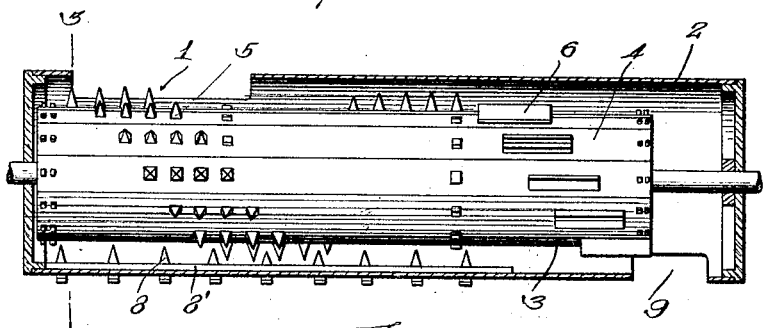
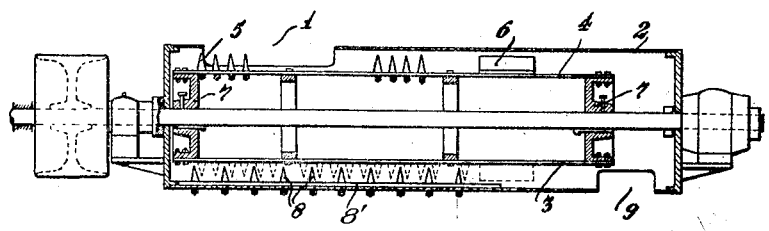
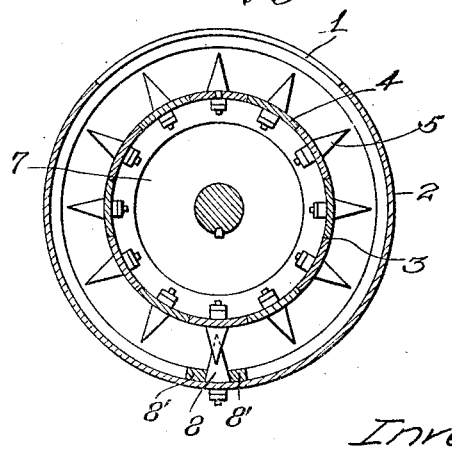
Inventor
E. B. Lucas
by Langner, Parry, Card & Langner
Attys.

Patented Jan. 26, 1926.

1,571,128

UNITED STATES PATENT OFFICE.

EDMUND BERNARD LUCAS, OF MADIOEN, JAVA.

THRASHING MACHINE.

Application filed November 30, 1925. Serial No. 72,358.

*To all whom it may concern:*

Be it known that I, EDMUND BERNARD LUCAS, a subject of the Queen of the Netherlands, residing at Ngadiredjo-Ngawi, Madioen, Java, Netherlands East Indies, have invented certain new and useful Improvements in Thrashing Machines, of which the following is a specification.

The present invention relates to a thrashing machine in particular for rice or "paddy," which is so constructed, that the "gabah" is delivered clean, that the waste is free of grains and that the "gabah" is not crushed.

According to the invention these results are attained by using a drum, having at the outer circumference for a part of its length a series of teeth and for the other part a series of upstanding plates both series being arranged to follow a helical line and which drum is rotatably mounted within a stationary drum, having an inlet and an outlet opening, in such a manner, that the teeth are located at the inletside and the plates at the outletside in the bottom, while the bottom of the stationary drum in a longitudinal direction is provided a row of teeth, so located that the teeth of the rotatable drum pass between them.

It is already known in rice-thrashing machines to use a drum, having at the outer circumference a series of teeth in helical succession or order, and having at the discharge-end, plates in the same succession or order, which drum is rotatably mounted within a stationary drum. However, it is new, in the bottom of the stationary drum, to provide a series of teeth arranged in a longitudinal direction according to this invention. In the known machines, there cannot be question of an intensive thrashing operation as is the case with the machine according to this invention.

In thrashing machines it is known in itself to arrange a series of teeth on the bottom of a stationary drum, in such a manner that the teeth of a rotatable drum pass therebetween. In these known machines, however, the straw to be thrashed is forced along the circumference of the drum in a tangential direction.

In the machine according to this invention, however, the severed "paddy," that is, the ears with "paddy" and a small part of the halms, is introduced into one end of the thrashing-machine, whereupon the material passes to the other end in consequence of the helically arranged teeth and plates, and through the entire length of the cylinder.

In the drawings illustrating the invention, by way of example;

Fig. 1 is a longitudinal schematic section, with many parts removed, for the sake of clearness;

Fig. 2 is a longitudinal section, parts being shown in elevation,

Fig. 3 is a section on line 3—3 of Fig. 2.

The "paddy" is supplied by a Jacob's ladder (not shown), which is arranged at right angles to the thrashing machine, and feeds it through a filling gutter or the like, terminating above the inlet opening 1 of the thrashing machine, and into the space between a stationary drum 2 and a drum 3 rotatably mounted therein.

The drum 3 comprises a number of bars 4, uniformly distributed around the circumference of the drum and is, for a part of its length, provided with teeth 5, and for the other part with upstanding plates 6. The bars 4 are united so as to form a rotatable unit by means of discs 7. The bottom of the stationary drum 2 is provided with a series of teeth 8, arranged in the longitudinal direction of the drum, and so located that the teeth of the rotatable drum can pass between them.

After the "paddy"-straw has been severed by an automatic cutting machine, so that only the ear with "paddy" and a small portion of the halm arrives in the machine, the straw is moved to the discharge end in consequence of the helical location of the teeth 5 and the plates 6, at which discharge end it leaves the stationary drum through an outlet 9. The mass falling down from the drum is received upon a sieve (not shown), which is constantly oscillating. The "gabah" and small waste particles fall through the meshes, the larger parts of "paddy" move forward and are there collected.

One or more flat strips 8' of metal may be arranged at either side of the series of teeth 8 on the bottom of the stationary drum, which strips after the mass to be thrashed is forced by the teeth and plates of the rotatable drum over the comb formed by the teeth 8, operate to further clean the "gabah" freed from the ears by smashing it against the edges of the strips.

Having now particularly described and ascertained the nature of my said invention and the manner in which the same is to be performed, what I claim and desire to secure by Letters Patent is:

1. A thrashing machine, comprising, a rotatable drum, helically arranged series of teeth on the outer circumference of the rotatable drum for part of the drum length and helically arranged upstanding plates on the outer circumference of the drum for the remaining part of the drum length, a stationary drum rotatably receiving the rotatable drum, an inlet and an outlet in the stationary drum, and a longitudinal row of teeth on the inner side of the stationary drum arranged to permit the teeth of the rotatable drum to pass between them.

2. A thrashing machine, comprising, a rotatable drum, helically arranged series of teeth on the outer circumference of the rotatable drum for part of the drum length and helically arranged upstanding plates on the outer circumference of the drum for the remaining part of the drum length, a stationary drum rotatably receiving the rotatable drum, an inlet and an outlet in the stationary drum, and a longitudinal row of teeth on the inner side of the stationary drum arranged to permit the teeth of the rotatable drum to pass between them, the teeth on the rotatable drum being adjacent the inlet end, and the plates adjacent the outlet end, of the stationary drum.

3. A thrashing machine, comprising, a rotatable drum, helically arranged series of teeth on the outer circumference of the rotatable drum for part of the drum length and helically arranged upstanding plates on the outer circumference of the drum for the remaining part of the drum length, a stationary drum rotatably receiving the rotatable drum, an inlet and an outlet in the stationary drum, and a longitudinal row of teeth on the inner side of the stationary drum arranged to permit the teeth of the rotatable drum to pass between them, the teeth on the stationary drum extending for substantially the same distance along the drum as do the helically arranged teeth on the rotatable drum.

In testimony whereof I affix my signature.

EDMUND BERNARD LUCAS.